United States Patent Office 2,980,685
Patented Apr. 18, 1961

2,980,685
PYRIDINE CARBOXYLIC ACID DERIVATIVES

Jean Druey, Riehen, Hans Isler, Bottmingen, and Karl Schenker, Basel, Switzerland, assignors to Ciba Pharmaceutical Products Inc., Summit, N.J.

No Drawing. Filed June 16, 1958, Ser. No. 742,021

Claims priority, application Switzerland July 17, 1957

4 Claims. (Cl. 260—295.5)

This invention relates to new pyridine carboxylic acid amides. More particularly it concerns pyridine monocarboxylic acid tetrahydrofurfurylamides and their acid addition salts. The new compounds may be substituted in any manner. More especially they contain a hydrocarbon radical at the amide nitrogen, in particular a lower alkyl radical, such as methyl, ethyl, propyl, butyl or amyl.

The invention relates more especially to pyridine carboxylic acid tetrahydrofurfuryl amides of the formula

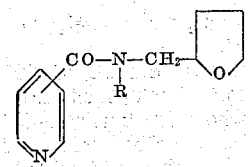

in which R represents hydrogen or a lower alkyl radical, primarily corresponding nicotinic acid amides and salts thereof.

The new pyridine carboxylic acid derivatives have valuable industrial and pharmacological properties. They have a deodorizing action and can therefore be employed in industry and cosmetics for improving smell. Furthermore, they have a stimulating effect on the central nervous system and can accordingly be employed as medicaments.

Especially valuable because of its deodorizing properties and a specific and preferred embodiment of the invention is nicotinic acid N-butyl-(n)-tetrahydrofurfurylamide of the formula

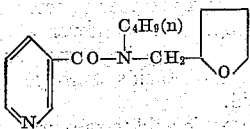

and its salts.

The new compounds are produced by methods known per se. Preferably, a pyridine carboxylic acid, advantageously in the form of a reactive functional acid derivative thereof, such as an ester with a readily volatile alcohol, a halide or anhydride, is reacted with a tetrahydrofurfurylamine, the nitrogen of which carries at least one hydrogen atom, to a pyridine monocarboxylic acid amide.

Advantageously, a pyridine-β-carboxylic acid or a reactive functional derivative thereof, such as a nicotinic acid lower alkyl ester or a nicotinic acid halide is reacted with the tetrahydrofurfurylamine, if desired in the presence of an acid-binding condensing agent.

The said reactions are carried out in a manner known per se in the presence or absence of diluents, if required at an elevated temperature, in open or closed vessels.

Depending on the reaction conditions, the new compounds are obtained in the form of the salts or as free bases. The salts can be converted in conventional manner into the free bases. Salts can be produced from the bases by reacting them in particular with strong acids. There may be especially mentioned as examples of acids strong inorganic or organic acids, for example the hydrohalic acids, sulfuric acid, perchloric acid or nitric acid.

The starting materials are known or can be produced by methods known per se. Preferably, the starting materials used are those which result in the end products which have been described at the beginning as being particularly valuable.

The new compounds may be employed in the form of industrial, cosmetic or pharmaceutical preparations. For pharmaceutical applications, the known solid or liquid carrier materials of inorganic or organic origin are employed, such as, for example, water, gelatine, lactose, starch, colloidal silicic acid, magnesium stearate, talc, vegetable oils, benzyl alcohols, gums, polyalkylene glycols, petroleum jelly, cholesterol or other known carriers for medicaments. The pharmaceutical preparations may, for example, be in the form of tablets, dragees, or in liquid form as solutions, suspensions or emulsions. If desired, they are sterilized and/or contain auxiliary substances, such as preserving, stabilizing, wetting or emulsifying agents, salts for variation of the osmotic pressure or buffer substances. They can also contain other therapeutically valuable substances. Cosmetic preparations contain known constituents of cosmetic bases, such as for example fats, waxes, higher alcohols, e.g. cetyl alcohol, fatty acid esters, for instance isopropyl myristate, and water. Cosmetic forms are for example salves, creams, powders, solutions, suspension or emulsions. The preparations are obtained according to customary methods.

The invention is illustrated in the following examples.

Example 1

14.8 grams of nicotinic acid anhydride and 6.5 grams of N-ethyl-tetrahydrofurfurylamine are boiled in 200 cc. of dry benzene for 6 hours while stirring and under reflux. After cooling, the solution is filtered with suction from the undissolved material, the benzene solution is shaken out twice with 5 cc. of a 2 N-solution of caustic soda in each case, dried over potash and then evaporated. The residue is fractionated under high vacuum. The distillate passing over at 0.05 mm. pressure of mercury at a temperature of 158–168° C. and permeated with crystals is stirred with ether and freed from the crystals by filtering with suction. The ether is distilled off and the residue is once more distilled under high vacuum. Under a pressure of 0.02 mm. of mercury, nicotinic acid N-ethyl-tetrahydrofurfurylamide of the formula passes over at a temperature of 163° C.

The N-ethyl-tetrahydrofurfurylamine employed as the starting material can be obtained as follows:

96 grams of furfuralethylamine are hydrogenated with 30 grams of Rupe nickel (nickel catalyst on clay) in 460 cc. of absolute ethanol in an autoclave having a volume of 1.37 liters at a temperature of 100–105° C. The initial pressure is 120 atmospheres gauge. After 3½ hours, 48.4 liters of hydrogen have been absorbed. The solution is now filtered off from the catalyst with suction, the ethanol is distilled off and the residue is fractionated at 12 mm. pressure of mercury. The main fraction passing over at 35–80° C. is once more fractionated in a column. N-ethyl-tetrahydrofurfurylamine is distilled under 10 mm. pressure of mercury at a temperature of 53–55° C.

Example 2

22.2 grams of nicotinic acid anhydride and 11.8 grams of N-butyl-(n)-tetrahydrofurfurylamine are heated in 300 cc. of dry benzene for 5 hours to boiling point while stirring and under reflux. After cooling, filtering with suction is carried out, the benzene solution is shaken out twice with 10 cc. of a 2 N-solution of caustic soda in each case, filtered and dried over potassium carbonate. The benzene residue is fractionated under high vacuum. In this way nicotinic acid N-butyl-(n)-tetrahydrofurfurylamide of the formula

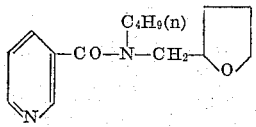

with a boiling point of 140–143° C. under 0.02 mm. pressure of mercury is obtained.

The N-butyl-(n)-tetrahydrofurfurylamine employed as the starting material can be obtained as follows:

64.2 grams of furfuralbutylamine are hydrogenated with 20 grams of Rupe nickel (nickel catalyst on clay) in 300 cc. of absolute ethanol in an autoclave having a volume of 1375 cc. at a temperature of 100–105° C. The initial pressure is 80 atmospheres' gauge and the absorption of hydrogen within 1¼ hours is 27.8 liters. Filtering off from the catalyst is now carried out with suction, the ethanol is evaporated at normal pressure and the residue is fractionated at 12 mm. pressure of mercury in a column. The N-butyl-(n)-tetrahydrofurfurylamine is distilled under 10 mm. pressure of mercury at a temperature of 84–87° C.

Example 3

13.5 grams of nicotinic acid anhydride are heated with 6 grams of tetrahydrofurfurylamine in 200 cc. of dry benzene for 6 hours to boiling point under reflux. Filtering with suction is carried out, the benzene solution is then shaken out with a little 1 N-caustic soda solution until no more of the latter is absorbed, the benzene solution is then dried over potassium carbonate and freed from the potassium carbonate and the benzene is then distilled off at 12 mm. pressure of mercury. The residue is fractionated under high vacuum. The nicotinic acid tetrahydrofurfurylamide, of the formula

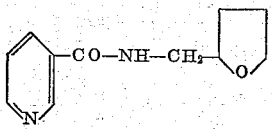

boils at a temperature of 140–146° C. under 0.02 mm. pressure of mercury.

Example 4

To 25.0 grams of isonicotinic acid chloridehydrochloride in 80 cc. of absolute dioxane and 11.0 grams of pyridine are added dropwise 22.1 grams of N-butyl-(n)-tetrahydrofurfurylamine. The mixture is then heated for 2 hours at 100° C. The reaction mixture is cooled and stirred into 250 cc. of ice-cooled saturated potassium carbonate solution. The whole is stirred for one hour and then extracted with chloroform. The chloroform extracts are dried over sodium sulfate and freed from the solvent, and the residue is distilled under high vacuum. Isonicotinic acid-N-butyl-(n)-tetrahydrofurfurylamide of the formula

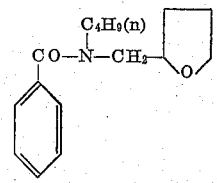

boils at 140–143° C. under 0.05 mm. pressure of mercury.

Example 5

7.3 parts by weight of cetyl alcohol
1.5 parts by weight of purified wool fat
5.0 parts by weight of isopropyl myristate
1.0 part by weight of nicotinic acid-N-butyl-(n)-tetrahydrofurfurylamide, and
0.08 part by weight of para-hydroxybenzoic acid propyl ester are melted in a water bath and heated to 80° C.

1.5 parts by weight of sodium lauryl sulfate
2.0 parts by weight of sorbitol solution of 70% strength, and
0.14 part by weight of para-hydroxybenzoic acid methyl ester.

are dissolved in 81.48 parts by weight of distilled water and heated to 80° C.

The filtered aqueous solution of 80° C. is stirred into the melted, strained fatty melt, also of 80° C., and emulsified. The whole is slowly cooled with stirring. If desired, the mixture can be perfumed at 40° C. The mixture is then homogenized and cooled to 25° C. with stirring. A cream with deodorizing action is obtained which spreads easily on the skin.

What is claimed is:

1. A member selected from the group consisting of pyridine-carboxylic acid tetrahydrofurfurylamides of the formula

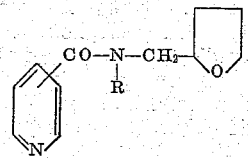

in which R stands for a member selected from the group consisting of hydrogen and a lower alkyl radical, and acid addition salts thereof with a member of the group consisting of hydrohalic acids, sulfuric acid, perchloric acid and nitric acid.

2. Pyridine-carboxylic acid tetrahydrofurfurylamides of the formula

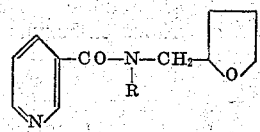

in which R stands for lower alkyl.

3. Nicotinic acid tetrahydrofurfurylamide.
4. Nicotinic acid N-butyl-(n)-tetrahydrofurfurylamide.

References Cited in the file of this patent

UNITED STATES PATENTS

| | | |
|---|---|---|
| 2,483,250 | Suter | Sept. 27, 1949 |
| 2,498,514 | Van Mater | Feb. 21, 1950 |
| 2,547,714 | Long et al. | Apr. 3, 1951 |
| 2,653,902 | Thurmon | Sept. 29, 1953 |
| 2,681,341 | Cronheim et al. | June 15, 1954 |